US012665766B2

(12) United States Patent
Peng et al.

(10) Patent No.: US 12,665,766 B2
(45) Date of Patent: Jun. 23, 2026

(54) METHOD, DEVICE, AND COMPUTER PROGRAM PRODUCT FOR SECURE CALLING

(71) Applicant: Dell Products L.P., Round Rock, TX (US)

(72) Inventors: Wenqing Peng, Dezhou (CN); Jinpeng Liu, Shanghai (CN); Tianxiang Chen, Shanghai (CN); Bin He, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/680,637

(22) Filed: May 31, 2024

(65) Prior Publication Data

US 2025/0330327 A1     Oct. 23, 2025

(30) Foreign Application Priority Data

Apr. 23, 2024     (CN) .......................... 202410495880.8

(51) Int. Cl.
*G06F 15/177*          (2006.01)
*G06F 9/00*          (2018.01)
          (Continued)

(52) U.S. Cl.
CPC .......... *H04L 9/3234* (2013.01); *G06F 21/575* (2013.01); *H04L 9/3268* (2013.01); *G06F 2221/034* (2013.01)

(58) Field of Classification Search
CPC ... H04L 9/3234; H04L 9/3268; G06F 21/575; G06F 2221/034; G06F 21/53
See application file for complete search history.

(56) References Cited

U.S. PATENT DOCUMENTS 9,918,226  B2 *   3/2018   Khan ................... G06Q 20/322
10,212,156  B2 *   2/2019   Thom ................. H04L 63/0823
          (Continued)

OTHER PUBLICATIONS

M. Tyson, "Your Washing Machine Could be Sending 3.7 GB of Data a Day," https://www.tomshardware.com/networking/your-washing-machine-could-be-sending-37-GB-of-data-a-day, Jan. 13, 2024, 10 pages.

(Continued)

*Primary Examiner* — Xuxing Chen
(74) *Attorney, Agent, or Firm* — Ryan, Mason & Lewis, LLP

(57) ABSTRACT

The present disclosure relates to a method, a device, and a computer program product. The method includes: in response to receiving a calling command from a client, determining whether the calling command includes a security identifier. The method further includes, in response to determining that the calling command includes a security identifier, determining a security service corresponding to the security identifier in a firmware trusted platform module (FTPM). The method further includes performing security isolation and encryption processing on data related to the calling command by using the security service in the FTPM. In this way, the real intention of the calling command is concealed by the security identifier, which can reduce the possibility of attackers attacking or tampering with the calling command. Therefore, embodiments of the present disclosure enhance the security of the system, protect the device from potential attacks and damage, and prevent unauthorized accesses and malicious operations.

20 Claims, 8 Drawing Sheets

(51) Int. Cl.
 *G06F 21/57* (2013.01)
 *H04L 9/32* (2006.01)

(56) References Cited

U.S. PATENT DOCUMENTS

| | | | | |
|---|---|---|---|---|
| 11,586,710 B2 * | 2/2023 | Aigner | ................. | G06F 21/123 |
| 2006/0259782 A1 * | 11/2006 | Wang | ................. | G06F 21/6245 |
| | | | | 713/189 |
| 2013/0031374 A1 * | 1/2013 | Thom | ................. | G06F 21/74 |
| | | | | 713/189 |
| 2014/0365763 A1 * | 12/2014 | Manohar | ................. | G06F 21/53 |
| | | | | 713/156 |
| 2020/0313890 A1 * | 10/2020 | Mondello | ............. | H04L 9/3239 |
| 2023/0267214 A1 * | 8/2023 | Zhang | ................. | H04L 9/14 |
| | | | | 713/189 |
| 2024/0345752 A1 * | 10/2024 | Don | ................. | G06F 3/0685 |
| 2025/0094601 A1 * | 3/2025 | Kar | ................. | G06F 21/57 |
| 2025/0110814 A1 * | 4/2025 | Klacar | ................. | G06F 9/541 |

OTHER PUBLICATIONS

Arm Limited, "Development of TEE and Secure Monitor Code," https://www.arm.com/technologies/trustzone-for-cortex-a/tee-and-smc, Accessed Mar. 12, 2024, 6 pages.

Arm Limited, "Learn the Architecture—TrustZone for AArch64," https://developer.arm.com/documentation/102418/latest/, Accessed Mar. 12, 2024, 4 pages.

H. Raj et al., "fTPM: A Firmware-based TPM 2.0 Implementation," Microsoft Research, MSR-TR-2015-84, Nov. 9, 2015, 23 pages.

L. Chen et al., "On the Design and Implementation of an Efficient DAA Scheme," International Conference on Smart Card Research and Advanced Applications (CARDIS), Apr. 2010, 15 pages.

S. Wesemeyer et al., "Formal Analysis and Implementation of a TPM 2.0-based Direct Anonymous Attestation Scheme," Proceedings of the 15th ACM Asia Conference on Computer and Communications Security, Oct. 2020, pp. 784-798.

* cited by examiner

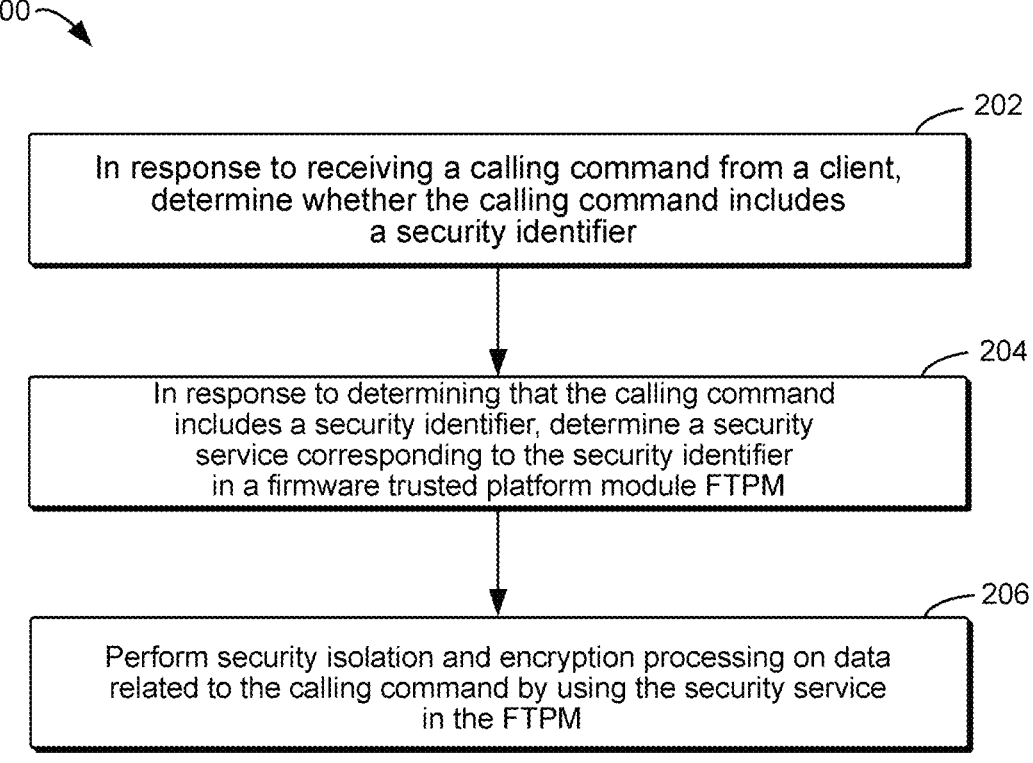

200

202

In response to receiving a calling command from a client, determine whether the calling command includes a security identifier

204

In response to determining that the calling command includes a security identifier, determine a security service corresponding to the security identifier in a firmware trusted platform module FTPM

206

Perform security isolation and encryption processing on data related to the calling command by using the security service in the FTPM

FIG. 2

METHOD, DEVICE, AND COMPUTER PROGRAM PRODUCT FOR SECURE CALLING

RELATED APPLICATION

The present application claims priority to Chinese Patent Application No. 202410495880.8, filed Apr. 23, 2024, and entitled "Method, Device, and Computer Program Product for Secure Calling," which is incorporated by reference herein in its entirety.

FIELD

Embodiments of the present disclosure relate to the field of information security, and more specifically, to a method, a device, and a computer program product for secure calling.

BACKGROUND

With the popularization of Internet of Things (IoT) devices and the enhancement of connectivity, attacks faced by such devices are becoming increasingly frequent and complex. In this case, hardware-based security solutions have attracted wide attention because of their inherent tamper resistance. Compared with software solutions, it is more difficult for attackers to tamper with or bypass hardware security solutions, because they are directly integrated into the hardware of devices and provide a higher level of protection.

A trusted platform module (TPM), as an independent hardware module parallel to the master processor, plays a key role in the security of IoT devices. It provides abundant security and encryption services, including key management, encryption and decryption, authentication, and other functions, thus effectively enhancing the security of the devices. The existence of a TPM chip enables the devices to operate safely without relying on external software or network, which reduces the risk of being attacked.

SUMMARY

Embodiments of the present disclosure provide a method, a device, and a computer program product for secure calling. In a first aspect of embodiments of the present disclosure, a method is provided. The method includes: in response to receiving a calling command from a client, determining whether the calling command includes a security identifier. The method further includes, in response to determining that the calling command includes a security identifier, determining a security service corresponding to the security identifier in a firmware trusted platform module (FTPM). The method further includes performing security isolation and encryption processing on data related to the calling command by using the security service in the FTPM.

In a second aspect of embodiments of the present disclosure, an electronic device is provided. The electronic device includes at least one processor, and a memory coupled to the at least one processor and having instructions stored therein. The instructions, when executed by the at least one processor, cause the electronic device to perform actions comprising: in response to receiving a calling command from a client, determining whether the calling command includes a security identifier; in response to determining that the calling command includes the security identifier, determining a security service corresponding to the security identifier in an FTPM; and performing security isolation and encryption processing on data related to the calling command by using the security service in the FTPM.

In a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions comprising: in response to receiving a calling command from a client, determining whether the calling command includes a security identifier; in response to determining that the calling command includes the security identifier, determining a security service corresponding to the security identifier in an FTPM; and performing security isolation and encryption processing on data related to the calling command by using the security service in the FTPM.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which:

FIG. 2 is a flow chart of a method for secure calling according to some embodiments of the present disclosure;

Throughout the accompanying drawings, identical or similar reference numerals represent identical or similar elements.

DETAILED DESCRIPTION

Figure 1:
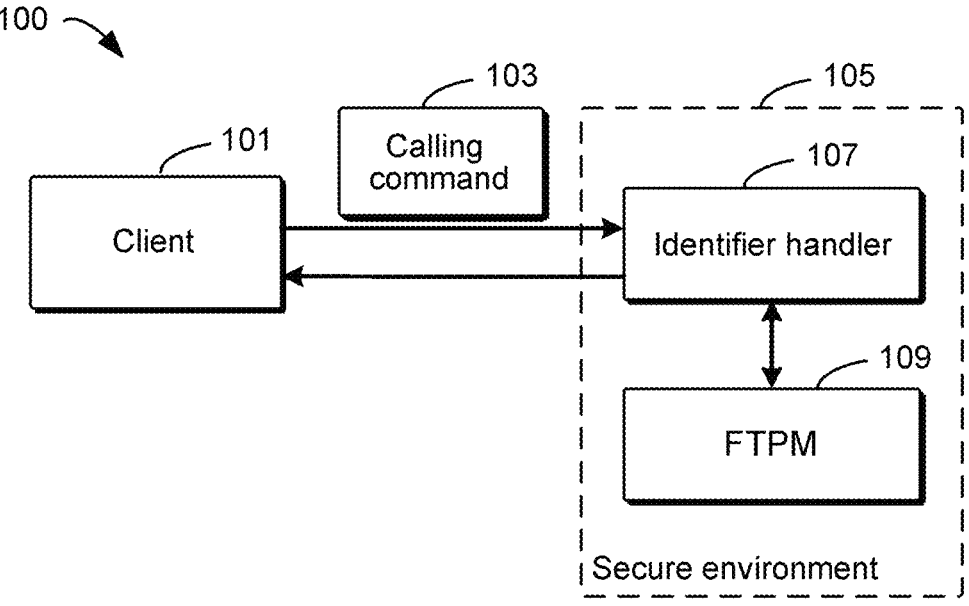
FIG. 1 is a schematic diagram of an example environment in which multiple embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects, unless explicitly illustrated. Other explicit and implicit definitions may also be included below.

Although TPM exhibits outstanding performance in improving system security, in practical applications, more Internet devices choose to be equipped with trust zone technology, such as, for example, Advanced RISC Machine (ARM) trust zone technology, where RISC denotes reduced instruction set computer. In related technologies, the ARM trust zone, as a commonly used core component in Internet of Things (IoT) devices, has powerful computing power and high flexibility. By taking advantage of the characteristics of the ARM trust zone in combination with a specific security mechanism and algorithm, a hardware-based trusted execution environment can be constructed, thus providing security guarantees similar to the TPM. In addition, by providing an FTPM in the ARM trust zone, the functions in the TPM can be called, thus indirectly realizing the security features of the TPM. However, this practice also brings some security risks.

When a client in an ARM trust zone communicates with a secure environment, the security of the calling command becomes a key issue. The communication process involves data transmission and exchange, which gives attackers an opportunity. The attackers may use various means to intercept, tamper with, or forge these calling commands, so as to achieve the purpose of undermining system security. Once a calling command is tampered with, a series of serious consequences may result. For example, an attacker may bypass security verification by tampering with the command and then gain illegal access; or disrupt the normal operation of the system by forging a command to perform malicious operations. These risks undoubtedly pose a serious threat to the security of IoT devices.

In view of this, embodiments of the present disclosure provide a solution for secure calling. In this solution, when calling a security service, the calling command includes a security identifier, the security service corresponding to the security identifier in an FTPM is called by using the security identifier, and then the security service is used in the FTPM, thus realizing the security isolation and encryption functions of the TPM. In this way, not only are the security isolation and encryption functions of the TPM realized, but also the real intention of a calling command is concealed by the security identifier, which makes it difficult for attackers to perceive and identify the calling command in network transmission, and reduces the possibility of attackers attacking or tampering with the calling command. Moreover, the attackers need to crack the security identifier first to tamper with the calling command, which increases the difficulty of tampering. As such, the security of the system is improved, the device is protected from potential attacks and disruptions, and unauthorized accesses and malicious operations are prevented.

FIG. 1 is a schematic diagram of an example environment 100 in which multiple embodiments of the present disclosure can be implemented. As shown in FIG. 1, the example environment 100 may include a client 101 and a secure environment 105. The client 101 may include a series of software and hardware components, such as a user interface, a communication module, and a security module. The user interface can provide an intuitive operation interface, which enables users to input instructions and view the device status conveniently. The secure environment 105 may be a highly isolated and protected trust zone for running secure operating systems and applications. In the secure environment 105, the operating systems and applications involve higher authority and have stricter access control. The secure environment 105 can ensure the security and integrity of its internal data through physical and logical isolation measures. The secure environment 105 may also have independent processor and memory resources, and a dedicated secure storage mechanism.

The example environment 100 may also include a calling command 103, which may be an operation instruction including the user intent. When the client 101 needs to call a specific function of the TPM, it generates a corresponding calling command 103 and sends it to the secure environment 105. After the calling command 103 is received by the secure environment 105, it is processed by an identifier handler 107 in the secure environment 105. The identifier handler 107 may be a component configured to identify and process the security identifier in the calling command 103. The identifier handler 107 analyzes the calling command 103 to check whether it includes a valid security identifier. In response to the calling command 103 including the security identifier, the identifier handler 107 communicates with an FTPM 109 according to the security identifier to call the required TPM function.

The FTPM 109 may be an entity that performs the TPM functions and has encryption and isolation capabilities, and can ensure the security and integrity of sensitive data. When the identifier handler 107 sends a calling request to the FTPM 109, the FTPM 109 performs corresponding TPM functions such as data encryption, decryption, signature verification, and the like according to the security identifier in the request. The example environment 100 can realize secure calling of the TPM functions through the cooperative work of the calling command 103, the identifier handler 107, and the FTPM 109.

As is apparent from the description above, when calling the security service in the solution, the calling command includes a security identifier, the security service corresponding to the security identifier in the FTPM is called by using the security identifier, and then the security service is used in FTPM, thus realizing the security isolation and encryption functions of the TPM. In this way, not only are the security isolation and encryption functions realized, but also the real purpose of the calling command is hidden, which makes it difficult for attackers to identify and capture the real calling command during network transmission, thus reducing the possibility of attacking or tampering with the command. Even if attackers intend to tamper with the calling command, they have to crack the complex security identifier, which increases the difficulty of tampering and further improves the overall security of the system. In this way, not only can the device be effectively protected from potential attacks and disruptions, but also unauthorized access and malicious operations can be strictly prevented.

It should be understood that description of the architecture and function in the example environment 100 is made for illustrative purposes only and does not imply any limitation to the scope of the present disclosure. Embodiments of the present disclosure may also be applied to other environments having different structures and/or functions.

The processes according to embodiments of the present disclosure will be described in detail below with reference to FIGS. 2 to 5. For ease of understanding, the specific data mentioned in the following description is all illustrative and is not intended to limit the scope of protection of the present disclosure. It should be understood that embodiments described below may also include additional actions not shown and/or may omit actions shown, and the scope of the present disclosure is not limited in this regard.

FIG. 2 is a flow chart of a method 200 for secure calling according to some embodiments of the present disclosure. In embodiments of the present disclosure, a password can be verified by a baseboard management controller or by a basic input/output system, and the process of verifying the password by different executors will be explained below with two embodiments. At block 202, in response to receiving a calling command from a client, it is determined whether the calling command includes a security identifier. For example, as shown in FIG. 1, when the client 101 needs to call a specific function of the TPM, it generates a corresponding calling command 103 and sends it to the secure environment 105. After the calling command 103 is received by the secure environment 105, it is processed by the identifier handler 107 in the secure environment 105. The identifier handler 107 analyzes the calling command 103 to check whether it includes a valid security identifier.

At block 204, in response to determining that the calling command includes a security identifier, a security service corresponding to the security identifier in the firmware trusted platform module FTPM is determined. For example, as shown in FIG. 1, after receiving the calling command 103, the identifier handler 107 can check the format of the calling command 103 and extract the security identifier from the calling command 103. The extraction process may include parsing and splitting the character string of the calling command 104 to accurately identify the location and content of the security identifier. After the security identifier is successfully extracted, the security identifier can be verified by the identifier handler 107.

When the security identifier is verified to be valid, the identifier handler 107 communicates with an FTPM 109 according to the security identifier to call the required TPM function. The identifier handler 107 can determine the security service corresponding to the security identifier according to a preset corresponding policy, which may be the mapping relationship between different security identifiers and various security services in the FTPM 109. Through the corresponding policy, the identifier handler 107 can accurately determine the security service corresponding to the current security identifier. The security services cover many functions of the FTPM, including but not limited to data encryption, decryption, authentication, and the like.

At block 206, security isolation and encryption processing is performed on data related to the calling command by using the security service in the FTPM. For example, as shown in FIG. 1, after receiving the request from the identifier handler 107, the FTPM 109 performs corresponding security isolation and encryption processing according to the security service information in the request. The security isolation and encryption processing may be enabling a data encryption algorithm to encrypt sensitive data; or performing a decryption operation to restore the encrypted data; or performing authentication to ensure the authenticity and reliability of the identity of the requester.

In this way, not only are the security isolation and encryption functions realized, but also the real purpose of the calling command is hidden through the security identifier, which makes it difficult for attackers to identify and capture the real calling command during network transmission, thus reducing the possibility of attacking or tampering with the command. Even if attackers intend to tamper with the calling command, they have to crack the complex security identifier, which increases the difficulty of tampering and further improves the overall security of the system. In this way, not only can the device be effectively protected from potential attacks and disruptions, but also unauthorized access and malicious operations can be strictly prevented.

Hereinafter, the process of secure calling will be described in detail with reference to FIGS. 3 to 5. In embodiments of the present disclosure, explanation is made in the order of the ARM trust zone architecture, OP-TEE architecture, communication process between the client and the secure environment in the ARM trust zone, the FTPM calling process, and the DAA algorithm calling process. The specific data referred to in the following description is all illustrative and is not intended to limit the scope of protection of the present disclosure. It should be understood that embodiments described below may also include additional actions not shown and/or may omit actions shown, and the scope of the present disclosure is not limited in this regard.

Figure 3A:
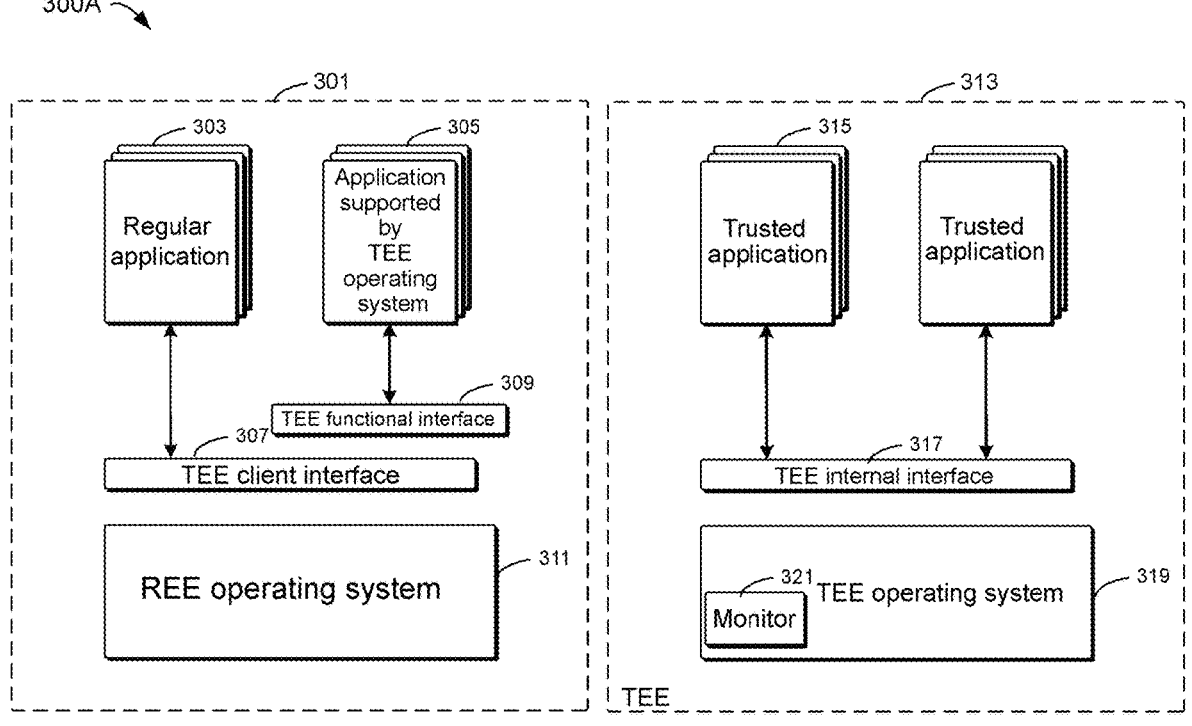
FIG. 3A is a schematic diagram of a reduced instruction set processor trust zone architecture according to some embodiments of the present disclosure.

FIG. 3A is a schematic diagram of an ARM trust zone architecture 300A according to some embodiments of the present disclosure. As shown in FIG. 3A, the ARM trust zone architecture 300A may include a rich execution environment (REE) 301 and a trusted execution environment (TEE) 313. The TEE may also be called a secure environment. The REE 301 can provide abundant functions and user interactions through a REE operating system 311, and the REE 301 includes at least one regular application 303, which is a common application running on the REE 301 and is not subject to hardware level security protection.

The TEE 313 is an independent and secure execution environment, which can run a trusted application 315 that needs high security through a TEE operating system 319. The TEE 313 protects the data and codes in the execution environment from being accessed or tampered with by external attackers through hardware isolation and a specific security mechanism. The trusted application 315 is an application running in the TEE 313, and the trusted application 315 has a higher security level than the regular application 303. Due to the isolation and security features provided by the TEE 313, the trusted application 315 can perform sensitive operations, such as processing critical data or performing encryption tasks. In some embodiments, the TEE operating system 319 may include a monitor 321, which may be a component configured to monitor the activities of the whole system, and the monitor 321 can record the interaction between the REE 301 and the TEE 313 to help identify potential security risks or abnormal behaviors.

The ARM trust zone architecture 300A may further include a TEE client interface 307, a TEE functional interface 309, and a TEE internal interface 317. The TEE client interface 307 is configured to provide a group of interfaces for interacting with the TEE 313, so that the regular application 303 in the REE 301 can conveniently call the functions and services of the TEE 313. The TEE functional interface 309 is configured to enable an application 305 supported by the TEE operating system in the REE 301 to interact with the functions and resources in the TEE 313. Through the TEE functional interface 309, applications in the REE 301 can request the TEE 313 to perform security tasks or access protected resources. The TEE internal interface 317 is configured to manage and coordinate the operations and resources inside the TEE 313.

Figure 3B:
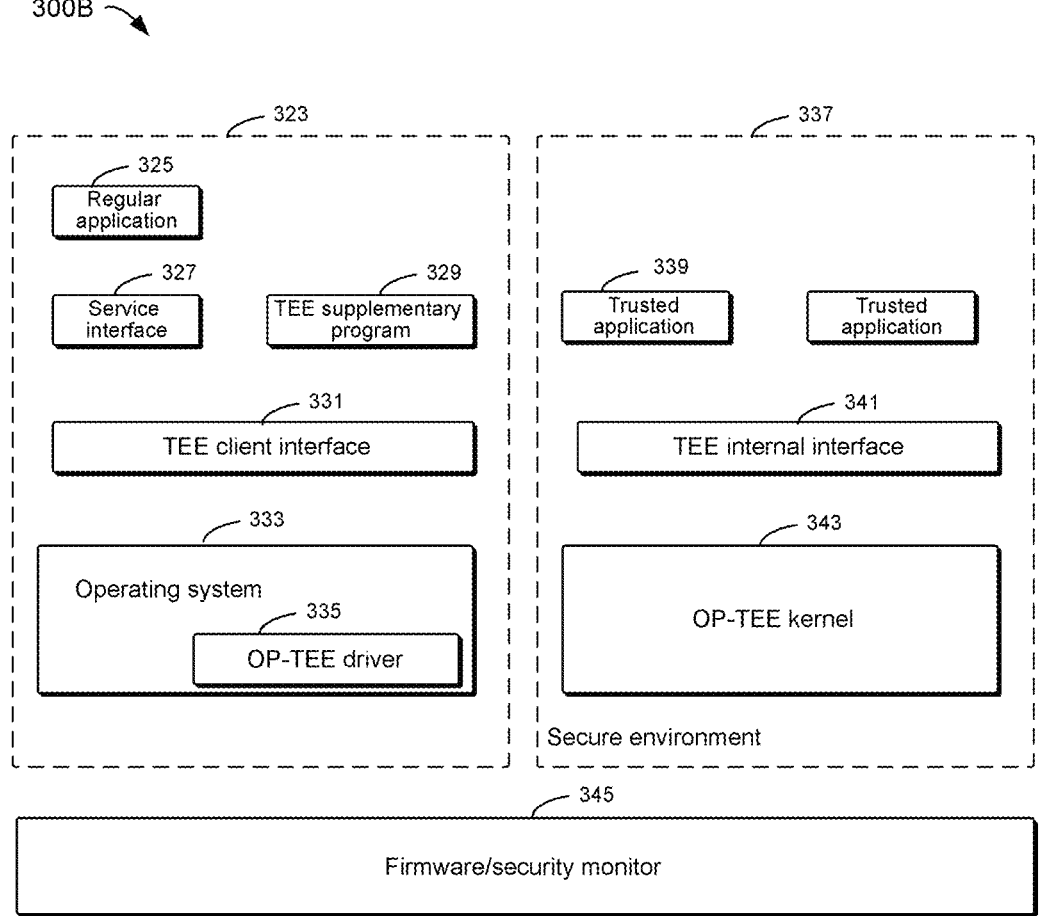
FIG. 3B is a schematic diagram of an open source trusted execution environment (OP-TEE) architecture according to some embodiments of the present disclosure.

FIG. 3B is a schematic diagram of an OP-TEE architecture 300B according to some embodiments of the present disclosure. As shown in FIG. 3B, the OP-TEE architecture 300B may include an insecure environment 323 and a secure environment 337. A regular application 325 runs in the insecure environment, and a trusted application 339 runs in the secure environment 337. The insecure environment 323 may include a service interface 327, a TEE supplementary program 329, and an OP-TEE driver 335. The service interface 327 is configured to provide an interface for the regular application 325 to access the functions of the secure environment 337. The TEE supplementary program 329 is configured to implement the TEE client interface 331 to provide a bridge for the regular application 325 to communicate with the secure environment 337. The OP-TEE driver 335 is responsible for managing the interaction between the TEE client interface 331 and devices in the secure environment 337 in the operating system 333. The operating system 333 may be a Linux or Android operating system.

The secure environment 337 may include a TEE internal interface 341 and an OP-TEE kernel 343. The TEE internal components can communicate and cooperate using the TEE internal interface 341. The OP-TEE kernel 343 is the core component in the secure environment 337, and is configured to manage the resources and the execution environment in the secure environment 337 and the interaction with other components. Also included in the OP-TEE architecture 300B is a firmware/security monitor 345.

As can be seen from FIGS. 3A and 3B, the OP-TEE enables the client in the ARM trust zone to communicate and cooperate effectively with the secure environment by providing an upper-layer interface and a series of security functions, and provides a way for the client application running in the insecure environment to access the secure environment by defining and realizing a standardized interface. These interfaces allow the client application to request the secure environment to perform various security operations, such as encryption, decryption, or data integrity check, while ensuring the confidentiality and integrity of the data during transmission and processing. As such, the comprehensive protection of the whole system is realized.

In some embodiments, in the process of starting the ARM trust zone, if the secure environment is not enabled correctly, the system will face security risks, as potential attackers may use this vulnerability to perform malicious operations or steal sensitive data. In order to ensure the secure startup of the ARM trust zone, each boot loading level has to go through a strict verification process. When starting the ARM trust zone, each boot loading level in the ARM trust zone is verified by the upper boot loading level, and the ARM trust zone is started after each boot loading level passes the verification. Through this layer-by-layer verification, the system can effectively resist potential security threats and attacks. The verification of the levels with each other not only ensures the integrity of software components, but also establishes a credible startup chain, which places the whole system in a secure environment from startup to operation.

In some embodiments, in the process of starting the ARM trust zone, the hash value of the FTPM in the ARM trust zone can also be verified by using the OP-TEE. The OP-TEE can use the stored certificate to verify the hash value of the FTPM, and then start the ARM trust zone after the verification is successful. In this way, the integrity of the FTPM and the fact that it has not been tampered with can be ensured, which can effectively prevent malicious software or attackers from replacing or modifying the FTPM, thus improving the security of the whole system.

Figure 3C:
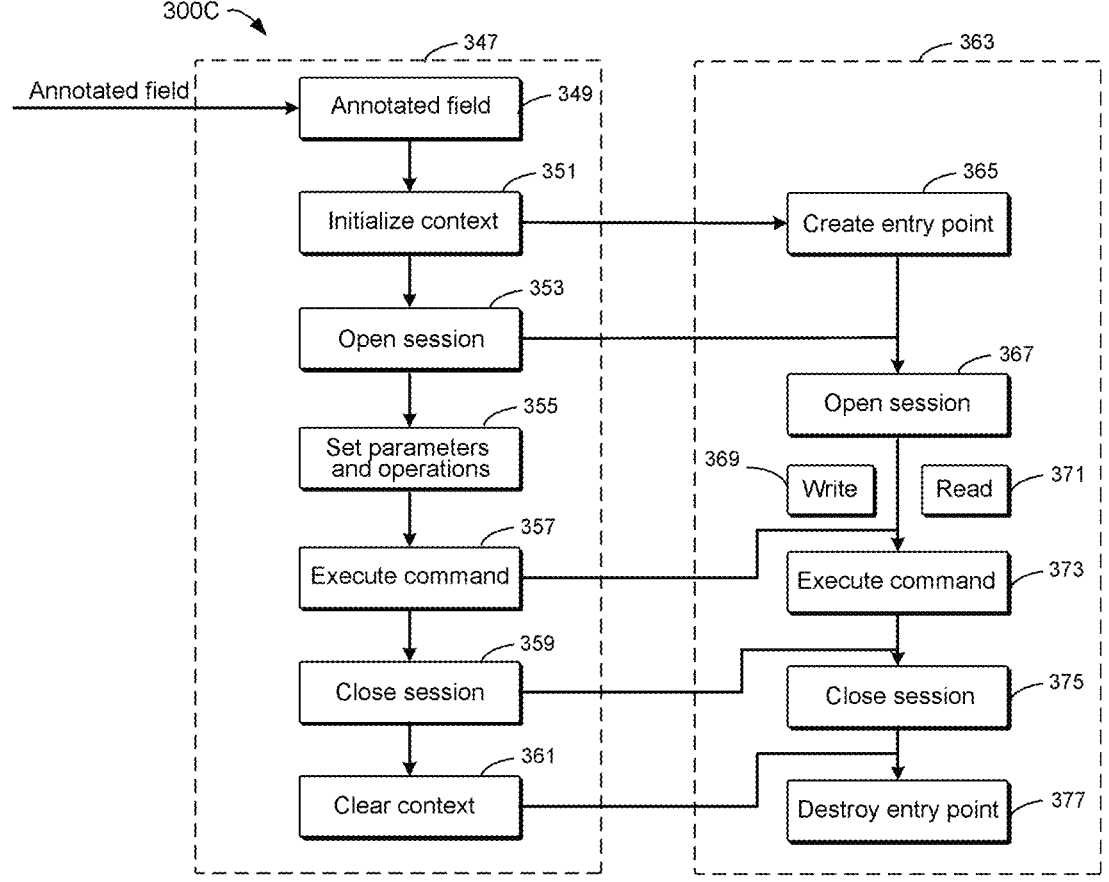
FIG. 3C is a schematic diagram of a process in which a client interacts with a secure environment in a trust zone according to some embodiments of the present disclosure.

FIG. 3C is a schematic diagram of a process 300C in which a client in an ARM trust zone interacts with a secure environment according to some embodiments of the present disclosure. FIG. 3C includes a client 347 and a secure environment 363. At block 349, an annotated field is received. The annotated field may be a calling command, and the calling command may be an operation instruction including the user intent. At block 351, a context is initialized. After receiving the calling command, relevant context information can be loaded or created according to the actual needs to prepare for the subsequent interaction. At block 365, an entry point in the secure environment is created. The entry point can be created in the secure environment 363 through the interface provided by the OP-TEE to receive the initialized context information.

At block 353, a session is opened. The session is opened in the client 347, and a request to open the session 367 is sent to the secure environment according to the session, so as to establish the connection between the client 347 and the secure environment 363 to prepare for subsequent execution of the command. After the session is established between the two communicating parties, the client 347 and the secure environment 363 can interact through the session. During the session, the client 347 and the secure environment 363 can exchange data many times, perform security operations, and so on.

At block 355, parameters and operations are set. According to the calling command received by the client 347, the parameters in the initialized calling command and the operation to be performed are determined. At block 369 and block 371, the initialized calling command is read and written. The parameters in the calling command and the required information are read and written in the secure environment 363. At block 357, the client 347 sends a request to execute the command to the secure environment 363. At block 373, the command is executed according to the set parameters and the read and written content in the secure environment 363. At block 359 and block 375, the session is closed. After executing the command, the interaction between the client 347 and the secure environment 363 is safely closed. At block 361, the context is cleared. After the interaction is closed, the client 347 performs necessary clearing work, such as releasing resources, to ensure secure ending of the interaction. At block 377, the entry point is destroyed. After the interaction is closed, the secure environment 363 closes the communication channel with the client 347.

Figure 4:
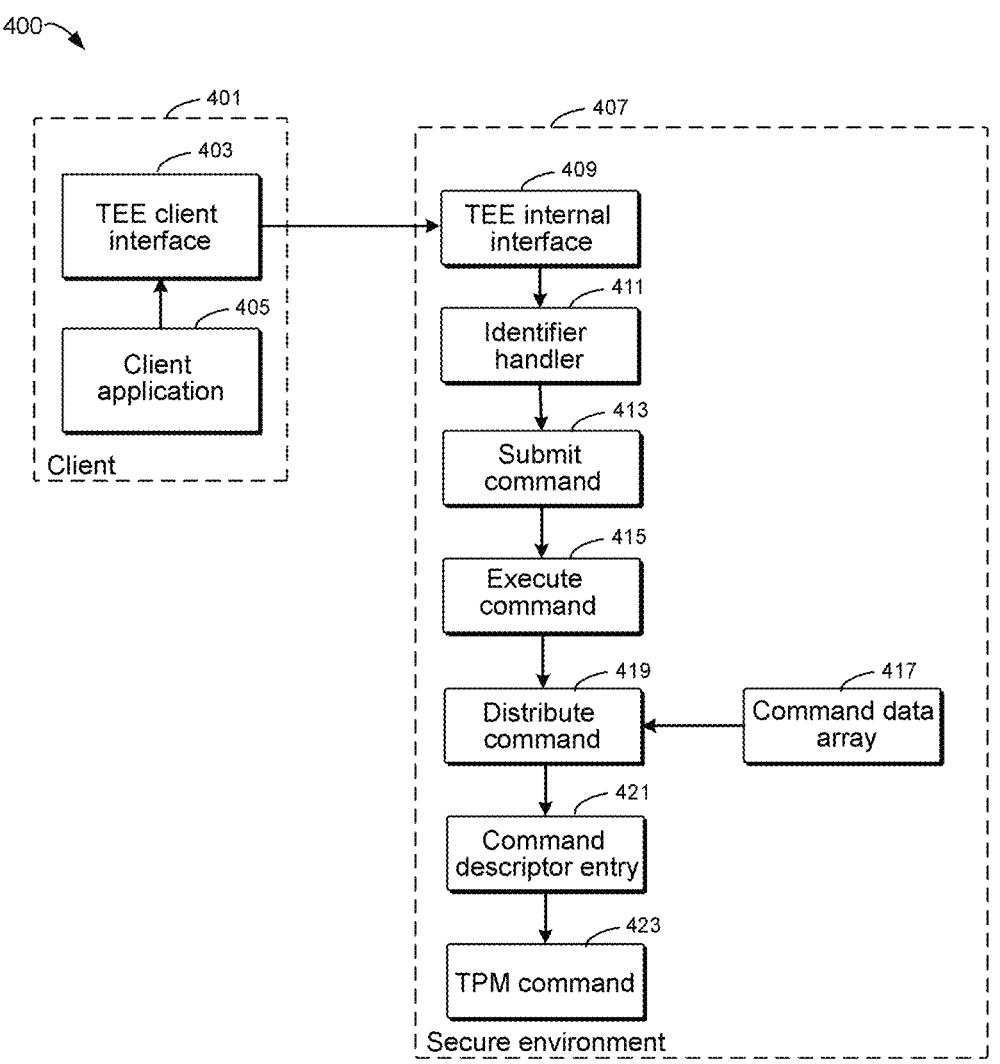
FIG. 4 is a schematic diagram of a process of securely calling a TPM command according to some embodiments of the present disclosure.

FIG. 4 is a schematic diagram of a process 400 of securely calling a TPM command according to some embodiments of the present disclosure. At block 405, a calling command is sent by a client application. The client application may be a common application running in the client 401, and the client application is not protected by hardware-level security. At block 403, the TEE client interface receives the calling command sent by the client application. The TEE client interface can be provided by the OP-TEE for establishing communication between the client 401 and the secure environment 407. At block 409, the TEE internal interface receives the calling command sent by the TEE client interface. The TEE internal interface can be provided by the OP-TEE for establishing communication between the client 401 and the secure environment 407 in cooperation with the TEE client interface.

At block 411, the calling command is processed by an identifier handler. The identifier handler in some embodiments may be viewed as implementing an FTPM command scheduler to schedule FTPM commands. The identifier handler first recognizes whether a security identifier is included in the calling command. When the calling command includes a security identifier, the security service corresponding to the security identifier can be determined in the secure environment 407 of the ARM trust zone based on the preset policy, and the FTPM sends the calling signal corresponding to the security service.

At block 413, the command is submitted. The identifier handler sends the calling signal to the FTPM in the secure environment 407 to achieve the purpose of submitting the TPM function calling command. At block 415, the command is executed. After receiving the calling signal, the FTPM starts to execute the steps needed to call the TPM function. At block 419, the command is distributed. In the FTPM, each different TPM command corresponds to a different entry point. Before executing the security service, that is, executing the TPM function, the command needs to be distributed to the entry point. Then, a command descriptor entry 421 corresponding to the entry point is determined according to a command data array 417 that is input in advance, and finally a TPM command 423 is executed according to the command descriptor entry 421.

In this way, the function of the TPM can be realized in the ARM trust zone, and security isolation and encryption functions can be realized for an Internet device without being installed with the TPM chip. Moreover, the real purpose of the calling command is hidden through the security identifier, which makes it difficult for attackers to identify and capture the real calling command in the process of network transmission, thus reducing the possibility of attacking or tampering with the command. Even if attackers intend to tamper with the calling command, they have to crack the complex security identifier, which increases the difficulty of tampering and further improves the overall security of the system. In this way, not only can the device be effectively protected from potential attacks and disruptions, but also unauthorized access and malicious operations can be strictly prevented.

Figure 5:
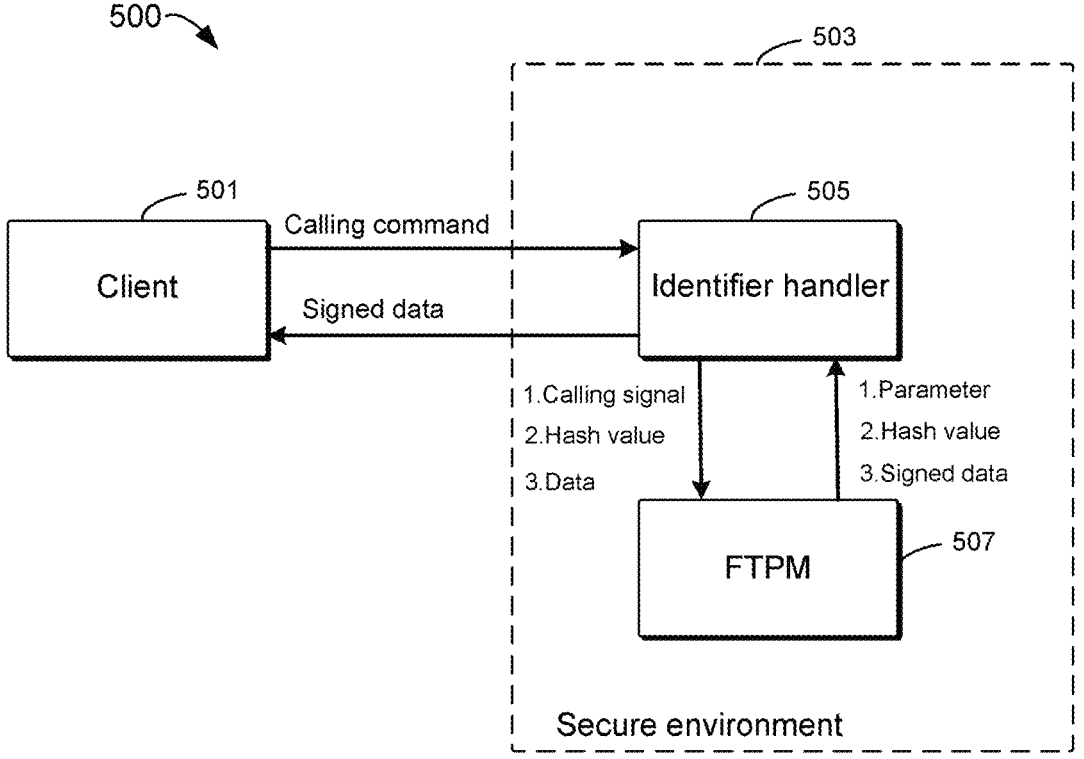
FIG. 5 is a schematic diagram of a process of securely calling a direct anonymous attestation (DAA) command according to some embodiments of the present disclosure.

FIG. 5 is a schematic diagram of a process 500 of securely calling a DAA command according to some embodiments of the present disclosure. As shown in FIG. 5, after the client 501 sends a calling command, the identifier handler 505 in the secure environment 503 identifies and analyzes the security identifier in the calling command. When the identifier handler 505 identifies the security service corresponding to the security identifier in the calling command as a DAA command, the identifier handler 505 sends a specific calling signal to the FTPM 507 according to the security identifier.

After receiving the calling signal, the FTPM 507 performs operations related to the DAA command according to a predefined rule and algorithm. The operations may include authentication of the client, generating or verifying a digital signature, and the like. The execution result of the FTPM 507 will be safely returned to the identifier handler 505. After receiving the response from the FTPM 507, the identifier handler 505 returns the signed data or processing result to the client 501.

The process of securely calling the DAA command runs entirely in the secure environment 503, which ensures the confidentiality and integrity of the data. The secure environment 503 prevents unauthorized access and data leakage through a number of security measures, such as access control, encrypted communication, and hardware security modules. In this way, the client 501 can securely interact with the FTPM 507 by sending the calling command, execute a specific security service, and obtain reliable results.

Figure 6:
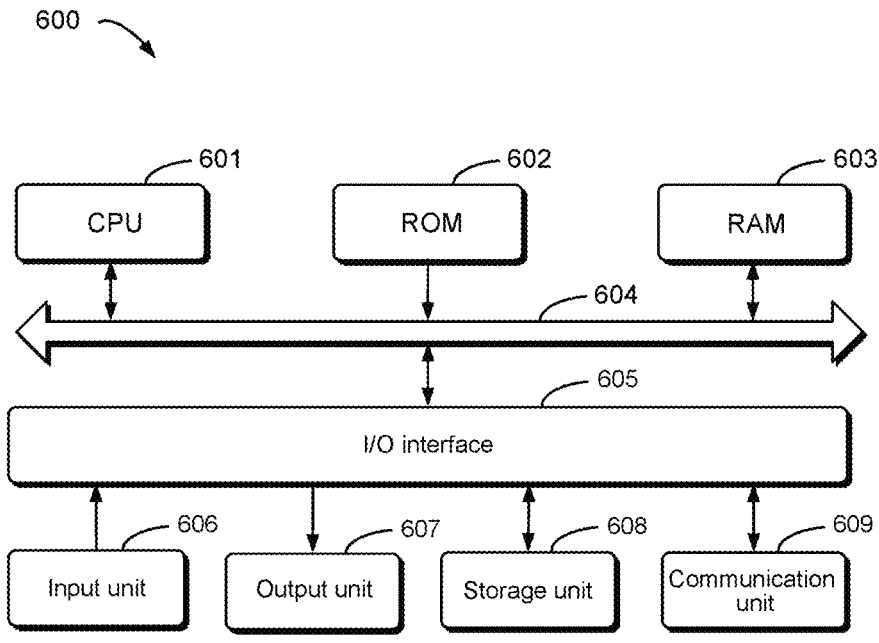
FIG. 6 is a block diagram of a device that can implement multiple embodiments of the present disclosure.

FIG. 6 is a block diagram of an example device 600 that can be used to implement embodiments of the present disclosure. As shown in the figure, the device 600 includes a computing unit 601, illustratively implemented as at least one central processing unit (CPU), that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The computing unit 601 may comprise various general-purpose and/or special-purpose processing components with processing and computing power. Some examples of the computing unit 601 include, but are not limited to, the above-noted one or more CPUs, a graphics processing unit (GPU), various special-purpose artificial intelligence (AI) computing chips, various computing units for running machine learning model algorithms, a digital signal processor (DSP), and any appropriate processor, controller, microcontroller, and the like. The computing unit 601 performs various methods and processes described above, such as the method 200. For example, in some embodiments, the method 200 may be implemented as a computer software program that is tangibly embodied in a machine-readable medium, such as the storage unit 608. In some embodiments, part of or all the computer program may be loaded and/or installed onto the device 600 via the ROM 602 and/or the communication unit 609. When the computer program is loaded to the RAM 603 and executed by the computing unit 601, one or more steps of the method 200 described above can be performed. Alternatively, in other embodiments, the computing unit 601 may be configured to implement the method 200 in any other suitable manners (e.g., by means of firmware).

The functions described herein can be performed at least in part by one or more hardware logic components. For example, without limitation, example types of hardware logic components that can be used include: a field programmable gate array (FPGA), an application specific integrated circuit (ASIC), an application specific standard product (ASSP), a system on chip (SOC), a complex programmable logic device (CPLD), and the like.

Program codes for implementing the method of the present disclosure may be written by using one programming language or any combination of multiple programming languages. The program codes may be provided to a processor or controller of a general purpose computer, a special purpose computer, or another programmable data processing apparatus, such that the program codes, when executed by the processor or controller, cause the functions/operations specified in the flow charts and/or block diagrams to be implemented. The program codes may be executed completely on a machine, executed partially on a machine, or executed partially on a machine and partially on a remote machine or executed completely on a remote machine or server as a stand-alone software package.

In the context of the present disclosure, the machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include electrical connection based on one or more wires, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these are not to be construed as limitations to the scope of the present disclosure. Certain features that are described in the context of separate embodiments may also be implemented in combination in a single implementation. Conversely, various features that are described in the context of a single implementation may also be implemented in multiple implementations separately or in any suitable sub-combination.

Although the present subject matter has been described using a language specific to a structural feature and/or a method logical action, it should be understood that the subject matter defined in the appended claims is not necessarily limited to the particular features or actions described above. Rather, the specific features and actions described above are merely example forms of implementing the claims.

What is claimed is:

1. A method, comprising:

in response to receiving a calling command from a client, determining whether the calling command includes a security identifier;

in response to determining that the calling command includes the security identifier, determining a security service corresponding to the security identifier in a firmware trusted platform module (FTPM); and performing security isolation and encryption processing on data related to the calling command by using the security service in the FTPM;

wherein the calling command is received by at least one interface provided by a trusted execution environment (TEE); and wherein the method further comprises:

determining at least a hash value of the FTPM based on the TEE;

verifying at least the hash value based on a certificate stored in the TEE; and controlling at least a portion of a process for configuring a trust zone comprising the FTPM responsive to the verifying.

2. The method according to claim 1, further comprising:

receiving, by a secure environment comprising a trust zone of a reduced instruction set processor, the calling command from a client of the trust zone based on an interface provided by an open source trusted execution environment (OP-TEE).

3. The method according to claim 2, wherein determining a security service corresponding to the security identifier in the FTPM comprises:

determining a security service corresponding to the security identifier in the secure environment of the trust zone based on a preset policy; and sending a calling signal corresponding to the security service to the FTPM based on the security service.

4. The method according to claim 3, further comprising:

sending the data that has gone through the security isolation and encryption processing from the secure environment of the trust zone to the client of the trust zone based on the interface provided by the OP-TEE.

5. The method according to claim 2, wherein the trust zone comprises a plurality of boot loading levels, and the method further comprises:

verifying each boot loading level in the trust zone by an upper boot loading level; and in response to each boot loading level passing the verification, determining to start the trust zone.

6. The method according to claim 5, further comprising:

determining a first hash value of the FTPM in the trust zone based on the OP-TEE;

verifying the first hash value based on a certificate stored in the OP-TEE; and in response to the first hash value being successfully verified, determining to start the trust zone.

7. The method according to claim 2, wherein performing security isolation and encryption processing on data related to the calling command by using the security service in the FTPM comprises:

determining parameters comprised in the data related to the calling command;

calculating a second hash value of the data based on the parameters; and signing the data based on the second hash value.

8. The method according to claim 7, further comprising:

sending the signed data from the secure environment of the trust zone to the client of the trust zone based on the interface provided by the OP-TEE.

9. An electronic device, comprising:

at least one processor; and memory coupled to the at least one processor and having instructions stored therein, wherein the instructions, when executed by the at least one processor, cause the electronic device to perform actions comprising:

in response to receiving a calling command from a client, determining whether the calling command includes a security identifier;

in response to determining that the calling command includes the security identifier, determining a security service corresponding to the security identifier in a firmware trusted platform module (FTPM); and performing security isolation and encryption processing on data related to the calling command by using the security service in the FTPM;

wherein the calling command is received by at least one interface provided by a trusted execution environment (TEE); and wherein the actions further comprise:

determining at least a hash value of the FTPM based on the TEE;

verifying at least the hash value based on a certificate stored in the TEE; and controlling at least a portion of a process for configuring a trust zone comprising the FTPM responsive to the verifying.

10. The electronic device according to claim 9, wherein the actions further comprise:

receiving, by a secure environment comprising a trust zone of a reduced instruction set processor, the calling command from a client of the trust zone based on an interface provided by an open source trusted execution environment (OP-TEE).

11. The electronic device according to claim 10, wherein determining a security service corresponding to the security identifier in the FTPM comprises:

determining a security service corresponding to the security identifier in the secure environment of the trust zone based on a preset policy; and sending a calling signal corresponding to the security service to the FTPM based on the security service.

12. The electronic device according to claim 11, wherein the actions further comprise:

sending the data that has gone through the security isolation and encryption processing from the secure environment of the trust zone to the client of the trust zone based on the interface provided by the OP-TEE.

13. The electronic device according to claim 10, wherein the trust zone comprises a plurality of boot loading levels, and the actions further comprise:

verifying each boot loading level in the trust zone by an upper boot loading level; and in response to each boot loading level passing the verification, determining to start the trust zone.

14. The electronic device according to claim 13, wherein the actions further comprise:

determining a first hash value of the FTPM in the trust zone based on the OP-TEE;

verifying the first hash value based on a certificate stored in the OP-TEE; and in response to the first hash value being successfully verified, determining to start the trust zone.

15. The electronic device according to claim 10, wherein performing security isolation and encryption processing on data related to the calling command by using the security service in the FTPM comprises:

determining parameters comprised in the data related to the calling command;

calculating a second hash value of the data based on the parameters; and signing the data based on the second hash value.

16. The electronic device according to claim 15, wherein the actions further comprise:

sending the signed data from the secure environment of the trust zone to the client of the trust zone based on the interface provided by the OP-TEE.

17. A computer program product tangibly stored on a non-transitory computer-readable medium and comprising machine-executable instructions which, when executed by a machine, cause the machine to perform actions comprising:

in response to receiving a calling command from a client, determining whether the calling command includes a security identifier;

in response to determining that the calling command includes the security identifier, determining a security service corresponding to the security identifier in a firmware trusted platform module (FTPM); and performing security isolation and encryption processing on data related to the calling command by using the security service in the FTPM;

wherein the calling command is received by at least one interface provided by a trusted execution environment (TEE); and wherein the actions further comprise:

determining at least a hash value of the FTPM based on the TEE;

verifying at least the hash value based on a certificate stored in the TEE; and controlling at least a portion of a process for configuring a trust zone comprising the FTPM responsive to the verifying.

18. The computer program product according to claim 17, wherein the actions further comprise:

receiving, by a secure environment comprising a trust zone of a reduced instruction set processor, the calling command from a client of the trust zone based on an interface provided by an open source trusted execution environment (OP-TEE).

19. The computer program product according to claim 18, wherein determining a security service corresponding to the security identifier in the FTPM comprises:

determining a security service corresponding to the security identifier in the secure environment of the trust zone based on a preset policy; and sending a calling signal corresponding to the security service to the FTPM based on the security service.

20. The computer program product according to claim 19, wherein the actions further comprise:

sending the data that has gone through the security isolation and encryption processing from the secure environment of the trust zone to the client of the trust zone based on the interface provided by the OP-TEE.

* * * * *